(12) United States Patent
Nachtigall, III

(10) Patent No.: US 11,034,502 B2
(45) Date of Patent: Jun. 15, 2021

(54) SELF-COMBINING RECEPTACLE FOR PRODUCING COATED OR ADMIXTURE PRODUCTS

(71) Applicant: Walter E. Nachtigall, III, Minneapolis, MN (US)

(72) Inventor: Walter E. Nachtigall, III, Minneapolis, MN (US)

( * ) Notice: Subject to any disclaimer, the term of this patent is extended or adjusted under 35 U.S.C. 154(b) by 0 days.

(21) Appl. No.: 15/137,830

(22) Filed: Apr. 25, 2016

(65) Prior Publication Data
US 2017/0050793 A1 Feb. 23, 2017

Related U.S. Application Data

(60) Provisional application No. 62/152,462, filed on Apr. 24, 2015.

(51) Int. Cl.
*B65D 81/32* (2006.01)
*A23P 20/15* (2016.01)
(Continued)

(52) U.S. Cl.
CPC .......... *B65D 81/3222* (2013.01); *A23L 19/05* (2016.08); *A23L 19/18* (2016.08);
(Continued)

(58) Field of Classification Search
CPC .... B65D 81/32; B65D 25/08; B65D 33/2533; B65D 33/2541; B65D 81/3222;
(Continued)

(56) References Cited

U.S. PATENT DOCUMENTS

| | | | | |
|---|---|---|---|---|
| 5,456,351 A | * | 10/1995 | Johnson | A47G 19/2227 206/19 |
| 6,062,468 A | * | 5/2000 | Tausanovitch | B65D 5/48024 206/219 |
| 6,089,375 A | * | 7/2000 | Johnson | A47G 19/02 206/541 |
| 6,230,969 B1 | * | 5/2001 | Spransy | B65D 81/3205 220/23.4 |

(Continued)

*Primary Examiner* — Ericson M Lachica
(74) *Attorney, Agent, or Firm* — DeWitt LLP

(57) ABSTRACT

A self-combining receptacle for producing a coated or partially-coated product or an admixture product is provided according to the invention. This receptacle can comprise a food service container for finger food like French fries having a sealed package of ketchup or other condiment installed in the bottom of the container and below the French fries where a closure panel extending outside the receptacle is pulled in a lateral direction away from the receptacle to peel off the closure panel to open the condiment package inside the container whereupon the French fries automatically drop down inside the container into the condiment contained in the now-opened condiment package. Alternatively, the self-combining receptacle may comprise two open faced vessels that are fitted together to join their common open faces with a common closure panel sealing the two open faces to divide the two vessels containing separate components of an admixture product. When the closure panel is removed from the receptacle or pierced by means of an integral utensil device, the two product components can be mixed together to produce the admixture product. Such an admixture product may comprise a food dish like fruit, granola pieces, chocolate pieces, or syrup mixed into yogurt or ice cream, or an industrial product like two resin components mixed together to produce an epoxy adhesive.

13 Claims, 13 Drawing Sheets

(51) Int. Cl.
*A23L 19/18* (2016.01)
*A23L 19/00* (2016.01)
*A23L 27/60* (2016.01)

(52) U.S. Cl.
CPC .............. *A23L 27/63* (2016.08); *A23P 20/15* (2016.08); *B65D 81/32* (2013.01); *B65D 81/3211* (2013.01)

(58) Field of Classification Search
CPC ........ B65D 81/3211; A24F 19/08; B65F 1/02; A21B 3/137; A47G 19/2205; A23P 20/15; A23L 19/18; A23L 19/05; A23L 27/63; B01F 15/0087; B01F 2215/0014; B01F 2215/0036
See application file for complete search history.

(56) References Cited

U.S. PATENT DOCUMENTS

| | | | | |
|---|---|---|---|---|
| 6,312,169 | B1* | 11/2001 | Keilegom | G03B 17/26 206/455 |
| 6,394,338 | B1* | 5/2002 | Sluder | B65D 5/18 229/120.15 |
| 2006/0068063 | A1* | 3/2006 | Zerfas | B65D 21/0223 426/120 |
| 2010/0124590 | A1* | 5/2010 | Feldmeier | A47G 21/001 426/120 |
| 2010/0233221 | A1* | 9/2010 | Folmer | A23D 7/005 424/401 |
| 2010/0320206 | A1* | 12/2010 | Caldwell | B65D 75/563 220/266 |
| 2013/0149417 | A1* | 6/2013 | Malone | B65D 25/08 426/112 |

* cited by examiner

SELF-COMBINING RECEPTACLE FOR PRODUCING COATED OR ADMIXTURE PRODUCTS

CROSS-REFERENCE TO RELATED APPLICATION

This application claims priority to U.S. Provisional Application No. 62/152,462 filed on Apr. 24, 2015, which is hereby incorporated by reference in its entirety.

FIELD OF INVENTION

This invention relates generally to a receptacle for producing a coated product or admixture product. More specifically, it relates to a receptacle for separately holding several items that can be easily actuated by a user to self-combine the items together to produce a mixed or a fully or partially-coated product, such as condiment applied to a finger food.

BACKGROUND OF THE INVENTION

French fries represent a popular culinary staple in the United States, Canada, United Kingdom, France, Belgium, Netherlands, and many other English and French-speaking countries. Constituting an elongated piece of deep-fried potato, they are served hot, either soft or crispy, and generally are consumed as part of lunch or dinner, or as a snack. They are featured on the menus at fast food restaurants, as well as sit-down restaurants. Indeed, 29% of the United States potato crop went in 2004 to making frozen French fries alone.

French fries are usually salted and served with ketchup. But other condiments or toppings like vinegar or mayonnaise may also be used. It is this combination of the savory condiment with the salty, fried taste of the potato that makes French fries so appealing to the palate.

Ketchup has traditionally been packaged in a bottle. The customer can unscrew the top of the bottle and pour a quantity of the ketchup on top of the French fries. But, this requires that the restaurant owner make a bottle of ketchup available at each table. Depending upon the size of the restaurant, a significant number of ketchup bottles may be required to satisfy the needs of the customers.

Another problem is created, moreover, by the fact that a significant quantity of French fries are served at fast food restaurants where customers may not eat their food at tables, and often take their French fries instead with them when they leave the restaurant. Thus, the French fries are served in portable containers that may be disposed of by the customer after the French fries are consumed. A quantity of ketchup may be poured on top of the French fries held in the container by the food server for the convenience of the customer. But, such ketchup pre-poured on top of the French fries can quickly make the French fries soggy. Such soggy French fries quickly become unappetizing for the customer.

Because of the large quantity of customers served by fast food restaurants, ketchup stations are often provided in the restaurant so that the customer can pour their own ketchup on their French fries. Such a station typically entails a delivery spout attached to a vessel of ketchup with a pull or push handle. The ketchup contained in the vessel is slightly pressurized, and the customer operates the handle to pour a desired quantity of ketchup from the spout on top of his or her French fries. Another advantage of such stations in restaurants is that they can feature additional spouts for other condiments like mustard, barbecue sauce, and horse radish sauce. But these condiment stations can quickly become dirty with spilled condiments left by customers that provides an unsanitary restaurant environment.

Therefore, many restaurants have resorted to providing their customers individual serving packages of ketchup and other condiments. Such packages often constitute a small, sealed pouch that must be torn by the customer to access the condiment contained inside which is then manually squeezed on top of the French fries. But, these sealed pouches are typically manufactured from polymer materials that are strong enough to prevent ruptures that would expose the condiment to air or dirt or bacteria that could lead to spoilage. These types of pouches can be difficult for customers to open.

Customers also can be turned off by having to handle French fries that are smothered in ketchup that will dirty their hands. Dipping just the ends of French fries instead in a small container of ketchup allows the French fries to be handled more cleanly, while enabling the customer to enjoy the savory taste of the ketchup on the salty French fries. This requires restaurants to provide small paper or plastic cups to its customers that can be filled by them with ketchup at the condiment station. But pouring ketchup into small cups often leads to spillage and dirty condiment stations. Alternatively, the customer must fill these small cups with ketchup contained in a number of the small individual packages. Having to tear the corner off a number of these packages to obtain the desired amount of ketchup can be frustrating for many customers.

Hence, ketchup and other condiment manufacturers have started to package their product in small plastic containers with a foil seal across their top. The customer peels the seal off the plastic cup to gain access to the condiment contained therein. This allows customers to dip their French fries in the ketchup or sauce contained in the cup. These types of foil-sealed cups can also be easily taken by customers to eat their French fries on the road. However, unless the customer is sitting down at a table, he must manipulate with his two hands the French fry service container, the individual fry and the condiment cup which requires a difficult degree of dexterity for many people. This can be even more difficult to manage if the customer is trying to eat a French fry while walking or driving a motor vehicle.

A "ketchup presser" is available in the fast food industry featuring a French fry service container with an elongated back panel with a fold-over panel and a slit. An opened plastic package of ketchup is inserted through the slit and the fold pressed by the customer's hand against the back panel to squeeze the ketchup onto the back panel above the French fries stored in the container. The customer can dip a fry into this resulting mound of ketchup. While this arrangement may be more convenient then handling a separate condiment cup, the plastic ketchup pouch must still be opened and inserted through the slot in the ketchup presser container and then pulled or pressed to release the ketchup. Moreover, the mound of ketchup can become messy and fall on top of the fries, thereby dirtying the hands of the customer eating the fries and making the remaining French fries soggy.

Therefore, it would be very advantageous to provide a portable service container for French fries having a sealed package of ketchup or other condiment installed in the bottom of the container and below the French fries. Such condiment package should be capable of easily being opened by the customer without having to separately remove it from the French fry container, whereupon the lower ends of the French fries are automatically dipped into the opened condiment. In this manner, the customer can open the condiment package to dip the French fries when he is ready to eat the fries. Such a container-condiment package apparatus should be portable and capable of being manipulated easily by two hands so that the customer may use it while walking or driving.

SUMMARY OF THE INVENTION

A self-combining receptacle for producing a coated or partially-coated product or an admixture product is provided according to the invention. In a first embodiment, this receptacle can comprise a food service container for finger food like French fries having a sealed package of ketchup or other condiment installed in the bottom of the container and below the French fries. The bottom ends of the French fries rest on top of the sealed condiment package. The end of the closure panel that seals shut the condiment package is doubled back upon itself, and extends through a slot formed in a side wall of the food service container, so that it may be grasped by the fingers of the customer. By pulling the end of the closure panel in a lateral direction away from the food service container side wall, the customer can easily peel off the closure panel to open the condiment package inside the container whereupon the French fries automatically drop down inside the container into the condiment contained in the now-opened condiment package. In this manner, the customer can open the condiment package without premature tearing of the foil seal to automatically dip the French fries, or a portion of the French fries, into the condiment when he is ready to eat the fries. Such a food service container is completely portable and dips the French fries in the condiment without creating a mess. Moreover, it is capable of being manipulated easily by the customer's two hands so that the customer may dip and eat his French fries while walking or driving. Furthermore, the restaurant serving the finger foods like French fries can provide its customers with a variety of different types of packaged condiments.

The self-combining food service container of this invention can also be used for other food items not constituting finger foods. For example, yogurt in the upper portion of the food service container may be automatically combined with granola chunks or strawberries or blueberries contained inside the sealed package positioned in the lower portion of the container when the closure panel is peeled away from the package by the customer. Likewise, ice cream can be combined with toppings like M&M candies or cookie pieces stored inside the package.

In a second embodiment of the invention, the self-combining receptacle may comprise two open faced compartments that are fitted together to join their common open faces with a common closure panel sealing the two open faces to divide the receptacle into two chambers containing separate components of an admixture product. When the user pulls the closure panel via an exterior tab to separate it from the receptacle, the two components can be mixed together to produce the admixture product. Such an admixture product may comprise a food dish like fruit, granola pieces, chocolate pieces, or syrup mixed into yogurt or ice cream. But, it may also comprise an industrial product like two resin components mixed together to produce an epoxy adhesive.

BRIEF DESCRIPTION OF THE DRAWINGS

In the accompanying drawings.

DETAILED DESCRIPTION OF THE PREFERRED EMBODIMENT

Figure 1:
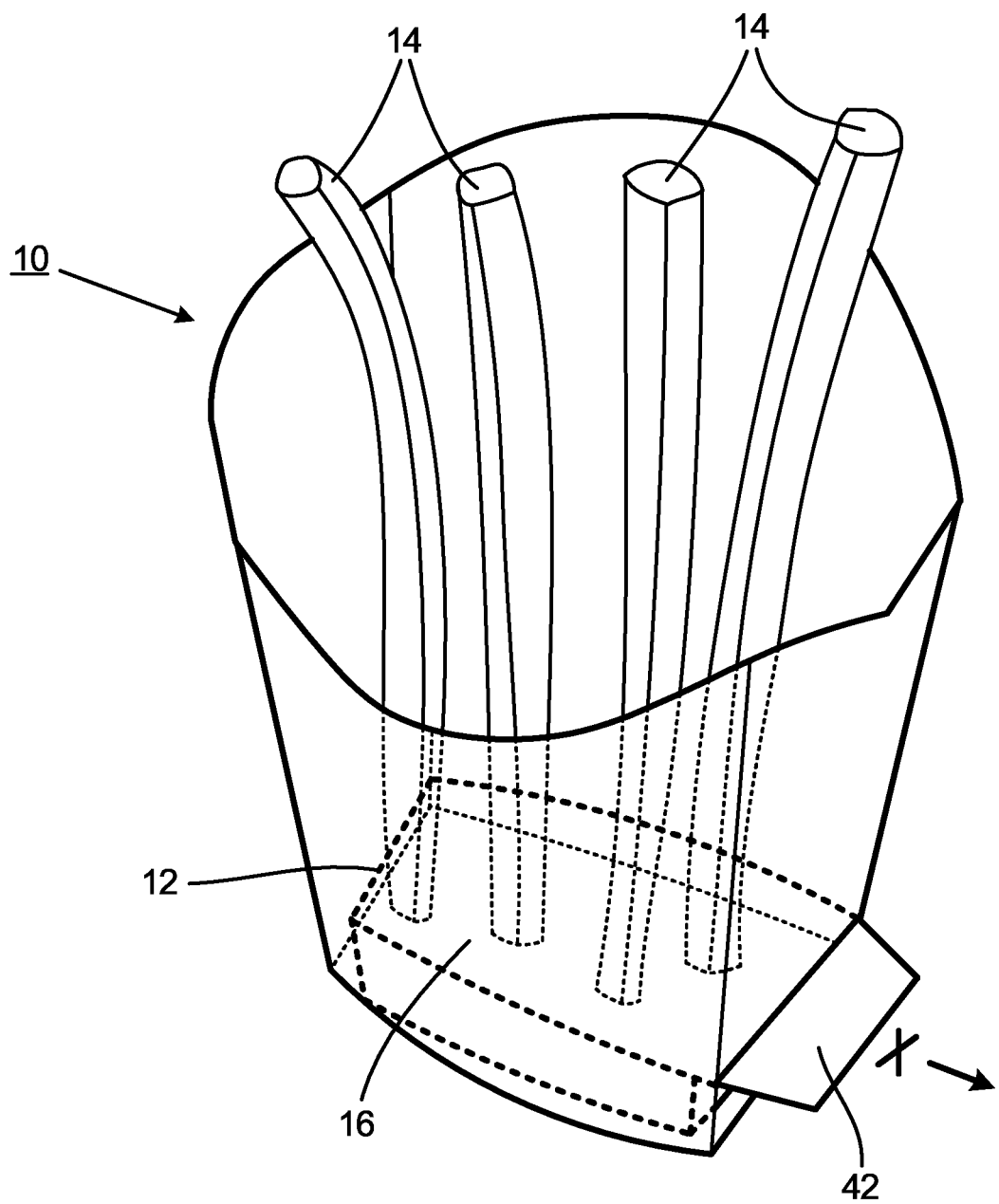
FIG. 1 is a perspective view of the self-combining food service receptacle of the present invention with the condiment package inserted into the bottom of the receptacle, and finger food like French fries loaded into the upper portion of the receptacle with their bottom ends resting on top of the sealed condiment package.

A self-combining receptacle for producing a coated or partially-coated product or an admixture product is provided according to the invention. This receptacle can comprise a food service container for finger food like French fries having a sealed package of ketchup or other condiment installed in the bottom of the container and below the French fries. The bottom ends of the French fries rest on top of the sealed condiment package. The end of the closure panel that seals shut the condiment package is doubled back upon itself, and extends through a slot formed in a side wall of the food service container, so that it may be grasped by the fingers of the customer to open the condiment package without direct access to the condiment package inside the receptacle. By pulling the end of the closure panel in a lateral direction away from the food service container side wall, the customer can easily peel off the closure panel to open the condiment package inside the container whereupon the French fries automatically drop down inside the container into the condiment contained in the now-opened condiment package.

Alternatively, the self-combining receptacle may comprise two open faced compartments that are fitted together to join their common open faces with a common closure panel sealing the two open faces to divide the receptacle into two chambers containing separate components of an admixture product. When the user pulls the closure panel via an exterior tab to separate it from the receptacle, the two components can be mixed together to produce the admixture product. Such an admixture product may comprise a food dish like fruit, granola pieces, chocolate pieces, or syrup mixed into yogurt or ice cream. But, it may also comprise an industrial product like two resin components mixed together to produce an epoxy adhesive.

The self-combining receptacle of this invention can also be used for other food items not constituting finger foods. For example, yogurt in the upper portion of the food service receptacle may be automatically combined with granola chunks or strawberries or blueberries contained inside the sealed package positioned in the lower portion of the container when the closure panel is peeled away from the package by the customer. Likewise, ice cream can be combined with toppings like M&M candies or cookie pieces stored inside the package. Such a self-combining receptacle is completely portable and coats or mixes the ingredients of the food dish or industrial product without creating a mess. Moreover, it is capable of being manipulated easily by the user's two hands, such as when a customer is dipping and eating his French fries while walking or driving.

For purposes of the present invention, "finger food" means any elongated piece of a food item that can be picked up with a person's fingers and dipped into a sauce. Illustrative examples of such a finger food include, without limitation, French fries, carrot sticks, celery sticks, broccoli spears, fish sticks, meat balls, meat strips or kabobs, crab legs, or lobster pieces.

As used within this Application, "condiment" means any savory food sauce that may be applied to a finger food, including by means of dipping. Illustrative examples of such a condiment include, without limitation, ketchup, mustard, mayonnaise, aioli, Sauce Andalouse, Sauce Americaine, barbecue sauce, curry sauce, hot sauce, garlic sauce, peanut sauce, horse radish sauce, Mammoet Sauce, pepper sauce, steak sauce, tartar sauce, vinegar, natural or flavored oil, grated cheese, melted cheese, sour cream, butter, or lemon juice.

For purposes of this invention, an "admixture" means a product resulting from mixing a second component into the first component. For example, the admixture may comprise a food dish in which a second component like strawberries, blueberries, or granola pieces are mixed into yogurt; or in which a second component like nuts, chocolate pieces, candies, or a flavored-syrup are mixed into ice cream. Alternatively, the admixture may comprise an industrial product like an epoxy adhesive in which a second resin component is mixed into the first resin component, or a plastic in which a second component like a hardener is mixed into a first component like the polymer resin. Following curing, an epoxy adhesive or plastic polymer resin is produced with desirable property characteristics.

While the self-combined receptacle for producing a fully or partially-coated product or admixture product is shown in this Application in the form of a self-dipping French fries food service container by way of example, it should be understood that the self-combining receptacle can adopt a number of other structural forms for different food and industrial product end use applications in which subcontainers containing two associated components may be combined by an end user removing a sealed closure panel from at least one of the subcontainers from outside the receptacle without having direct access to the closure panel in the interior of the receptacle.

FIG. 1 shows the self-combining food service receptacle 10 of the present invention holding multiple food items. Such receptacle 10 comprises a container 12 that is open at its top end, and holds a plurality of finger food pieces 14, such as French fries. Positioned inside container 12 at or near its bottom is a sealed container 16 of a condiment.

Figure 2:
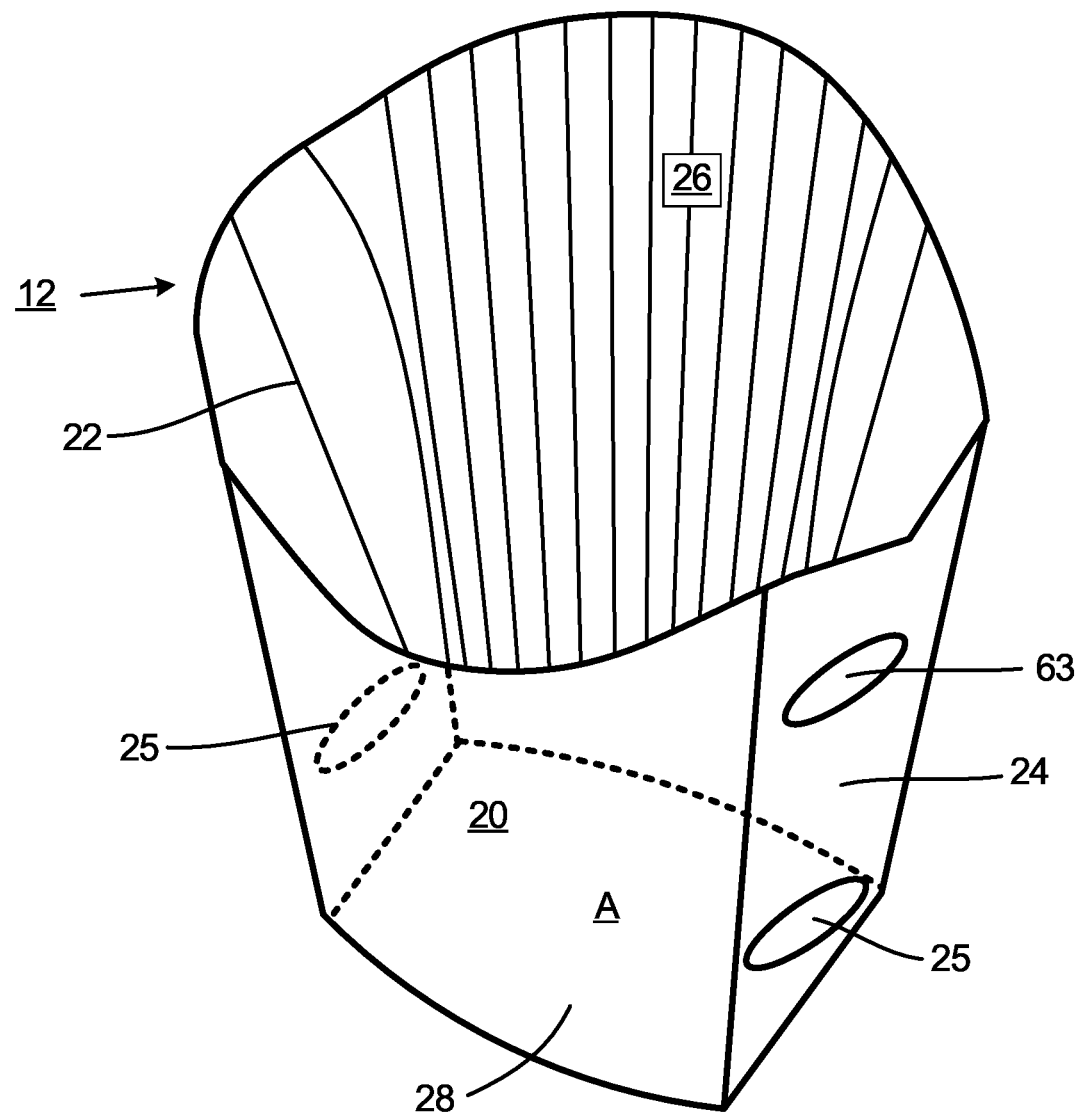
FIG. 2 is a perspective view of the food service receptacle.

As shown more clearly in FIG. 2, the food container 12 comprises a front panel 20, side panels 22 and 24, back panel 26, and bottom panel 28. While food container 12 may bear a top panel (not shown) for keeping the food item inside the container hot or cold for the customer's enjoyment, the top panel may be omitted to allow a finger food 14 like French fries to extend upwardly from the top of the container so that they may be easily grasped by the customer and consumed. This presumes that the finger food item(s) 14 will be quickly eaten by the customer before they lose their desired hot or cold serving temperature. Back panel 26 may extend vertically above the opening of the finger food items 14 to help to support the food items. The bottom panel 28 of food container 12 can bear a square, rectangle, circle, oval, triangle, or other suitable cross-sectional shape A.

Container 12 may be made from any suitable material for containing the food or industrial chemical components like cardboard, plastic, metal or coated metal, or glass. The cardboard materials may be die cut to form the side, front, back and bottom panels that are then folded into alignment and secured with glue to form the container 12. Alternatively, a plastic polymer resin like polyethylene, polypropylene, polystyrene, nylon, or epoxy or phenolic polymers may be injection molded, blow molded, foamed, or thermo formed to fabricate the container. The interior surface of the container may be coated with a suitable material to make it resistant, e.g., to greasy food items, or the chemicals of the industrial product components.

Figure 3:
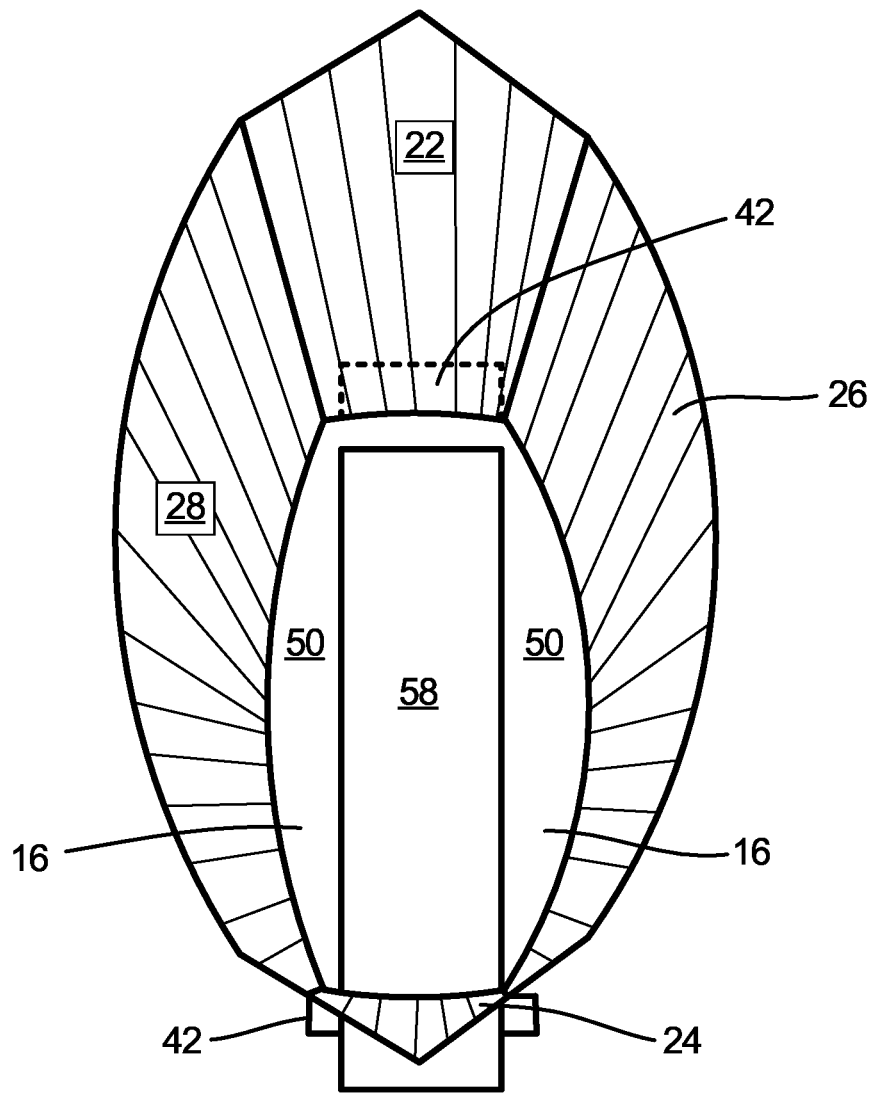
FIG. 3 is a top plan view of the food service receptacle of FIG. 1.
Figure 4:
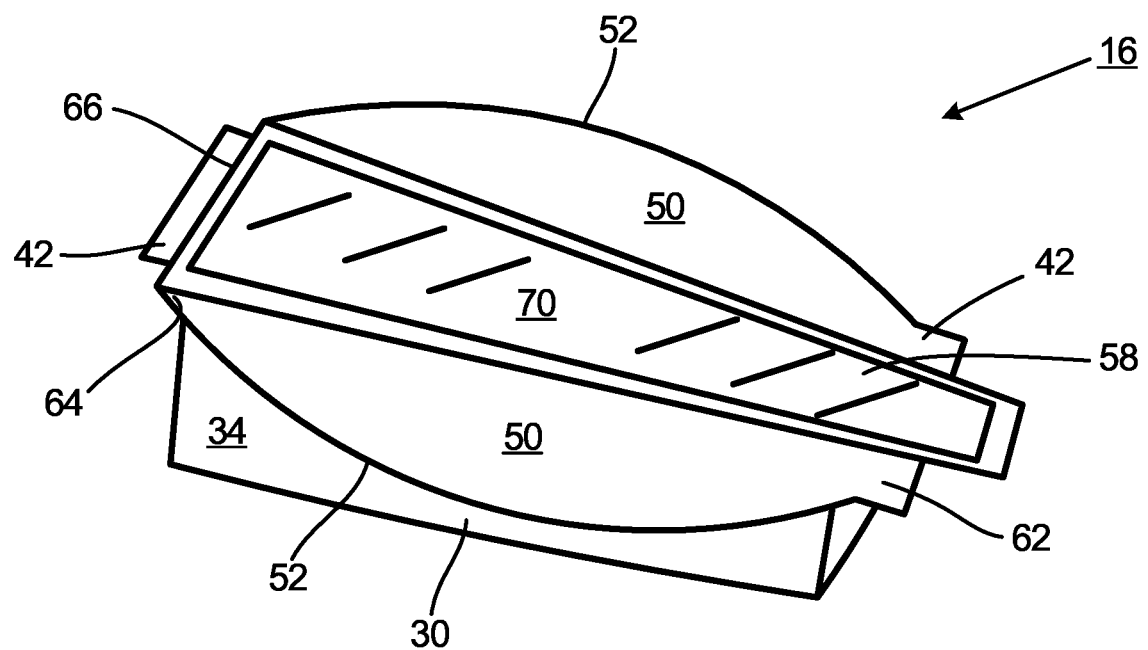
FIG. 4 is a perspective view of the condiment package with the removal lever of the closure panel doubled back upon itself.

As shown in FIGS. 1 and 3, condiment package 16 is positioned within the bottom region of food container 12. As shown more clearly in FIGS. 4-6, this condiment package 16 comprises a vessel 30 for containing a predetermined volume of the condiment.

The vessel 30 has a bottom wall 32 and side walls 34 for containing the condiment without leakage. The vessel preferably bears a flat bottom wall 32 to promote stable orientation of the condiment package inside the food container 12, but other configurations for the bottom wall are possible. The vessel 30 may also bear any of a number of different cross-sectional shapes B, such as a square, rectangle, circle, oval, or triangle, with slanted or vertical side walls 34. Preferably the cross-sectional shape B of the condiment package 16 will closely mirror the shape and dimensions of the cross-sectional shape A of the bottom of food container 12 so that condiment package 16 can be placed into the bottom region of the food container in stable alignment without being able to move around appreciably inside the food container and tip over.

Side walls 34 of condiment package vessel 30 terminate along their top edge in peripheral lip 38. This lip 38 bears a relatively flat top surface 40 surrounding vessel 30. Extending laterally from the peripheral lip 38 are a plurality of tabs 42. For example, two tabs 42 may extend from the opposite ends of the peripheral lip 38 of vessel 30. These tabs 42 maybe extended through slots 25 positioned in side walls 22 and 24 of food package 12 (see FIG. 2). When tabs 42 engage slots 25, the condiment package 16 is held securely inside the bottom region of food container 12.

The vessel 30 may be made from any suitable material for containing the condiment material therein. For example, it may be fabricated from a polymer plastic like polyethylene, polypropylene, polystyrene, polyethylene terephthalate ("PET"), acrylic, or polyester. A resin of such polymer plastic material may be used to compression mold, injection mold, blow mold, foam, or thermoform the vessel 30 as is known in the industry. Alternatively, depending upon the product to be contained inside the package container, the package vessel 30 may be made from another material like glass, metal, or coated metal.

In order to maintain the freshness of the condiment inside the vessel 30 without spoiling, the top of condiment package 16 is sealed by a closure panel 50. The closure panel 50 acts as a barrier against light and oxygen to enable the condiment that was aseptically packaged inside the package vessel 30 to be stored without refrigeration until the package vessel is opened by the customer. Because the package vessel 30 is sized for a single serving of the condiment corresponding to the amount of finger food stems 14 like French fries served inside serving receptacle 12, there will typically be no need to refrigerate the condiment package vessel 30 after it is opened to eat the French fries. This closure panel is made from a suitable material like a metal foil or plastic film. Aluminum foil and tin foil are examples of such a metal foil. Exemplary plastic films for purposes of this invention are cast, extruded, calendered using a polymer resin. They may also be co-extruded or laminated. Depending upon the product to be contained inside the package container, the polymer resin may include without limitation polyethylene, polypropylene, polyester, nylon, or polyvinyl chloride.

Figure 5:
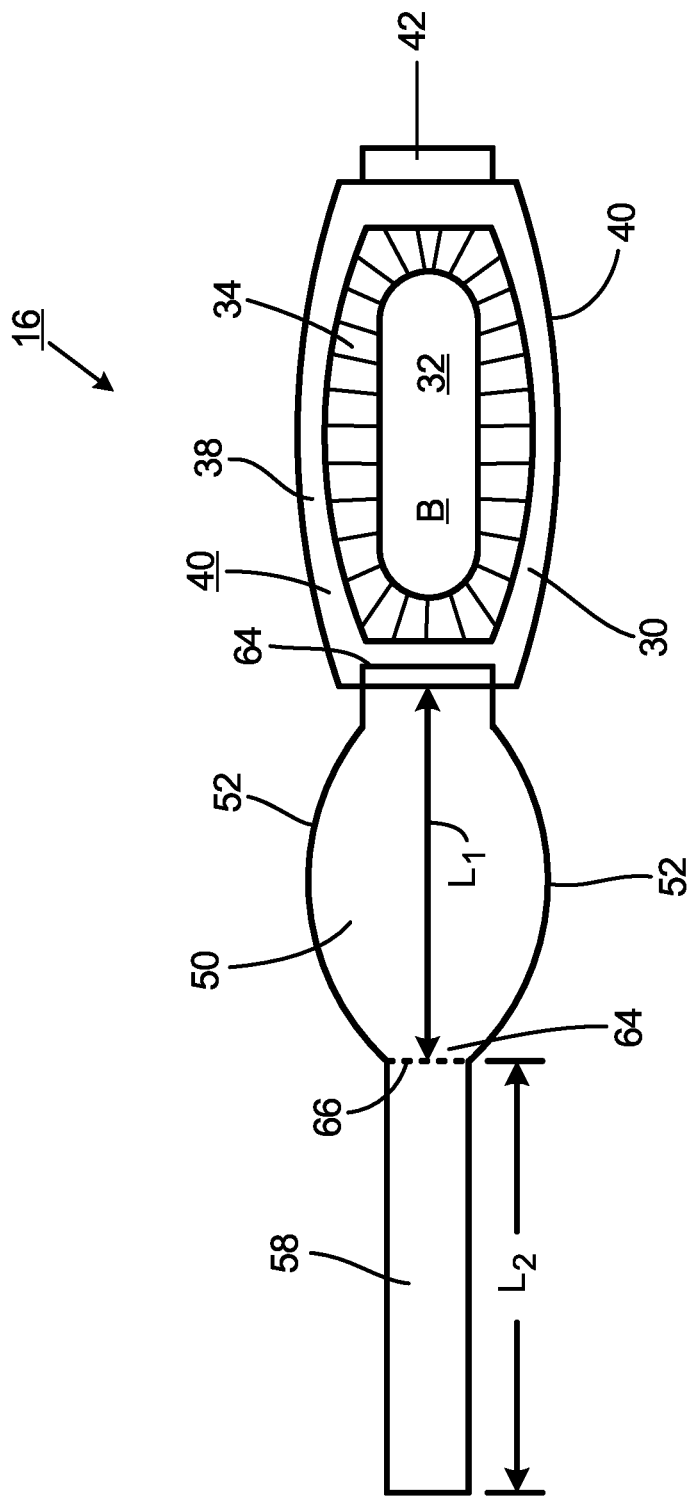
FIG. 5 is a top plan view of the condiment package of FIG. 4 with the closure panel removed from the condiment package to unseal it via the removal lever.
Figure 6:
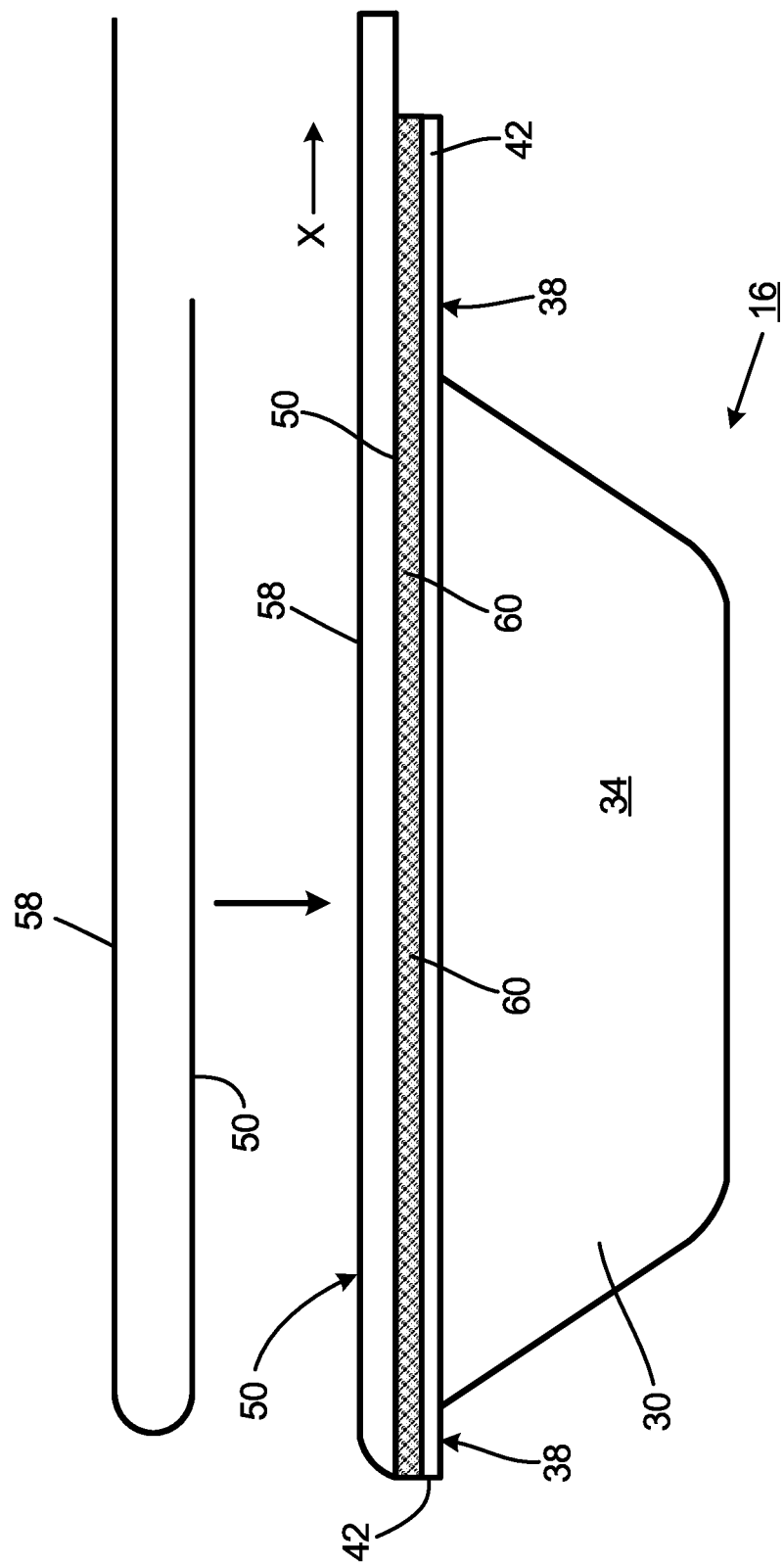
FIG. 6 is a side view of the condiment package of FIG. 4 with the closure panel sealing the condiment package.

Closure panel 50 is shown more clearly in FIG. 5. It is made from a thin flexible sheet of the metal foil or film material that is secured to the peripheral flat top surface 40 surrounding the condiment package vessel 30 with a releasable adhesive so that the closure panel may be removed by the customer to gain access to the condiment. Thus the adhesive is applied to the peripheral edges 52 of the closure panel 50 and the flat top surface 40 of peripheral lip 38 of the condiment package vessel 30 to provide a secure and uniform seal. The closure panel 50 may be made of any shape that is suitable for enabling it to seal the top of the condiment package vessel, but preferably it should match the shape and dimensions of the peripheral lip 38 of the vessel in order to make it easier to apply the adhesive at the appropriate spots on the bottom surface of the closure panel 50 and flat top surface lip 40 of the vessel's peripheral lip to produce the seal.

The adhesive 60 may comprise a removable pressure-sensitive adhesive made from, e.g., acrylate-based polymers. Such releasable adhesive will generally exhibit low adhesion to form a temporary bond between the closure panel 50 and peripheral lip 38 of the vessel 30, while enabling it to be subsequently broken by the customer to remove the closure panel 50 from the vessel 30 to gain access to the condiment.

If the condiment package 16 were supplied to the customer separately from the self-combining receptacle 16 holding the French fries 14, then the closure panel 50 could be provided with a tab extending from it or folded back from one corner of it in order to enable the customer to directly grasp the tab and easily to peel off the closure panel, as is known in the fact food and restaurant industries. But, condiment package 16 is served instead inside the bottom region of the receptacle 12 below the French fries where the customer cannot directly access the closure panel 50 without removal of the French fries. Thus, the closure panel 50 of this invention comprises a removal lever 58 extending from the end 62 of the closure panel 50 opposite to the end 64 that is secured by the adhesive 60 to the peripheral lip 38 of the condiment package vessel 30. This removal lever 58 may comprise a separate piece of material that is attached to end 62 of closure panel 50. Alternatively, it may be formed from the same sheet of, e.g., aluminum foil or plastic film used to form the closure panel. In this case, a separate backer 70 made from a material like cardboard or plastic may be secured to the top surface 72 of the removal lever 58 to strengthen it and prevent tearing of the foil or film material of removal lever 58 as it is pulled by the customer to peel closure panel 50 off the top of the condiment package vessel 30.

As shown in FIG. 5, there is a fold line 66 formed between closure panel 50 and removal lever 58. This allows removal lever 58 to be doubled back on top of closure panel 50, as shown more clearly in FIG. 4. Only the closure panel 50 is adhesively secured the top surface 40 of peripheral lip 38 of vessel 30 to seal the top of condiment package 16 with the removal lever 58 folded back on top of the closure panel. When the removal lever 58 is pulled laterally by the customer's fingers in direction X through slot 25 in container wall 24, then the closure panel 50 which is connected to removal lever 58 will be likewise pulled away from the top of vessel 30 of condiment package 16 and through slot 25 to open the package and reveal the condiment for self-dipping by the French fries.

When condiment package 16 is placed inside food container 12 with tabs 42 extending through slots 25 formed in side walls 22 and 24 of the food container 12, removal lever 58 should also extend through slot 25 so that it is readily accessible by the customer's fingers outside the food service container 12. Meanwhile the finger food pieces 14 are positioned inside food container 12 with their bottom ends resting on top of closure panel 50 which seals the condiment contained inside package 16.

The condiment package 16 is opened by having the customer pull the removal lever 58 in lateral direction X away from the self-combining receptacle. Pulling removal lever in this manner indirectly pulls closure panel 50 to which it is connected in the same direction to roll back the closure panel and peel it away from peripheral lip 38 of vessel 30, and be pulled laterally through slot 25 outside of self-combining receptacle 12. This allows finger food items 14 to fall by means of gravity with their bottom ends immersed in the now-accessible condiment contained in the opened package 16. Because the closure panel 50 will roll back as it is pulled, nothing will catch on the bottom end of the finger food items 14 resting upon the top surface of the closure panel. In this manner, the condiment is exposed neatly to the finger food without mess as the closure panel is pulled away. The customer can grasp the top end of a finger food item 14 like a French fry extending from the top of food container 12, and eat it with its bottom end already dipped in the condiment, such as ketchup. At the same time, slot 25 acts like a squeegee to remove residual condiment from the back of the closure panel as it is pulled through the slot and keep it inside the receptacle 12. This feature prevents the condiment from getting on the fingers of the customer or messing up the eating area.

The customer may pull the end of the closure panel to open condiment package 16 when he is ready to eat the finger food. This will prevent the finger food from becoming soggy with the condiment before that point in time. Moreover, the customer may choose to pull the closure panel only partly away from the package vessel 30 to expose only a portion of the finger food items to the condiment at a time.

This feature enables a slower-eating customer to keep his finger food fresh and only dip the individual items as they are being eaten.

Figure 7:
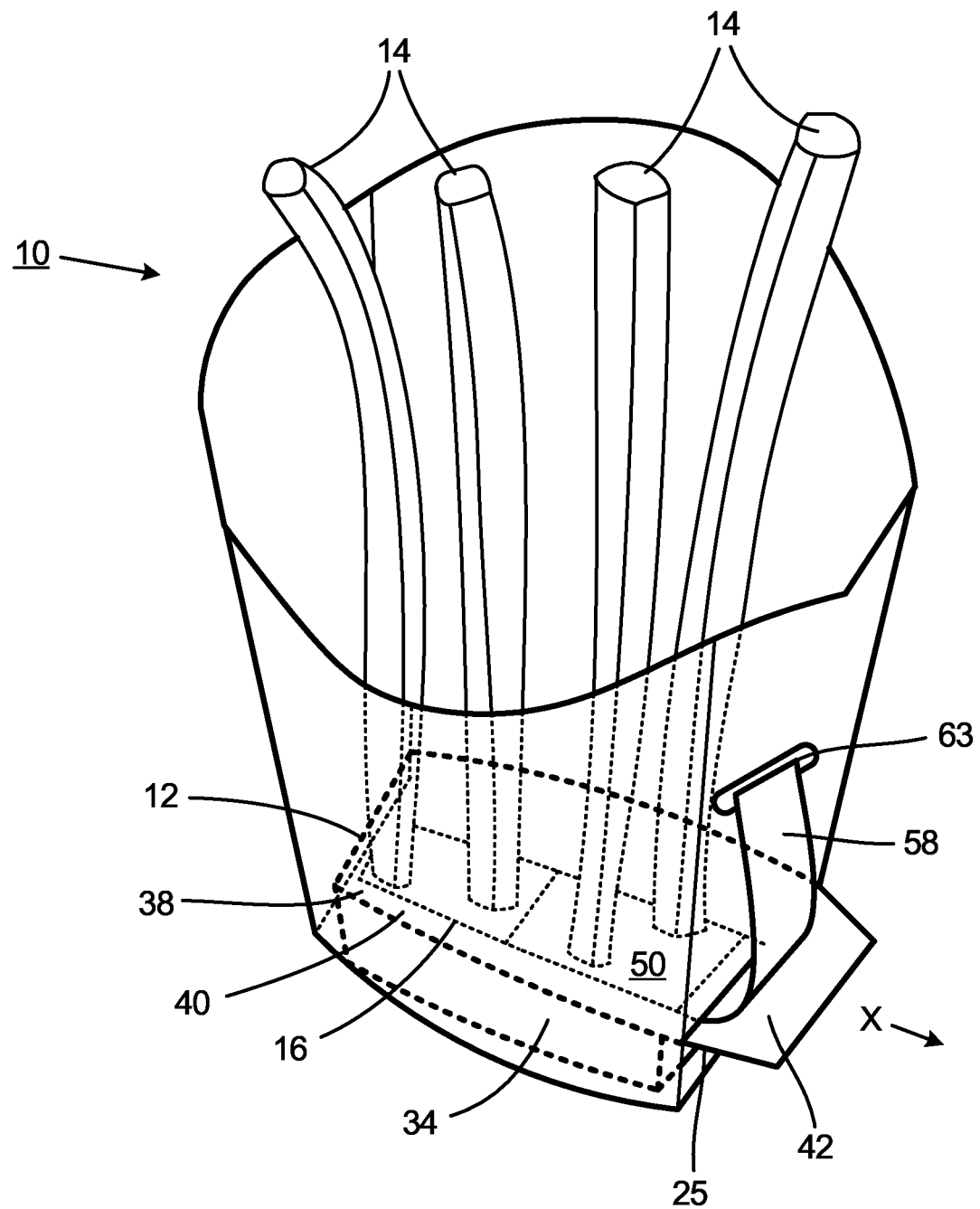
FIG. 7 is perspective view of an alternative embodiment of the food service receptacle.

FIG. 7 shows an alternative embodiment of food service container 60. It is similar to food service container 12 described above except that it bears an upper slot 73 alongside panel 22. Closure panel 50 is inserted through slot 25 and pulled through slot 25, as described above to open condiment package 16 contained inside food service container 60. But the end of closure panel 50 can be pushed by the customer through upper slot 73, so that the portion of closure panel pulled outside the food service container 60 is safely pressed against the container side wall 22 with its dirty bottom surface bearing condiment residue positioned against the side wall to avoid mess for the customer.

Figure 8:
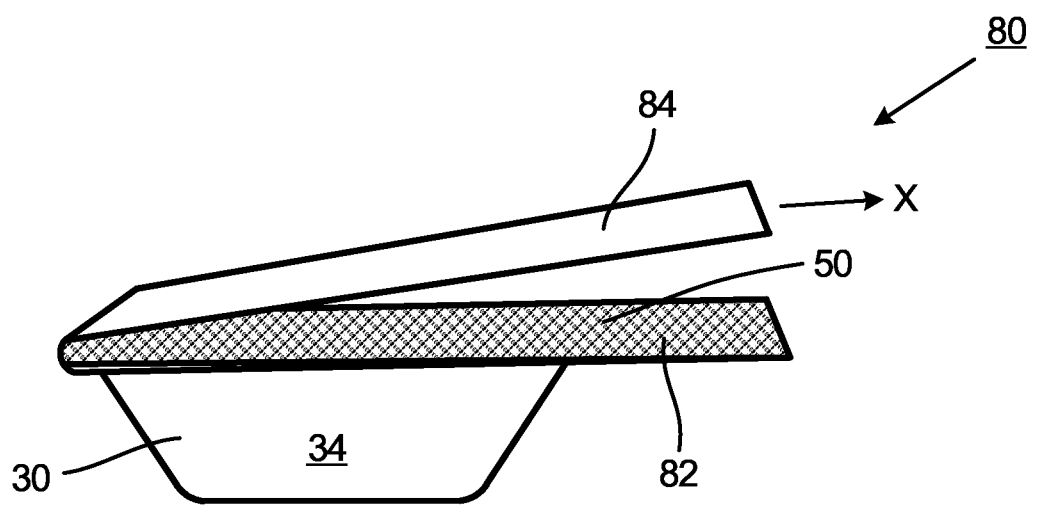
FIG. 8 is a perspective view of an alternative embodiment of the condiment package.

An alternate embodiment of condiment package 80 is shown in FIG. 8. It comprises a vessel 30 having side walls 34, as described above for condiment package 16. But it also features an enlarged support tab 82 and pull tab 84 panels. Closure panel 50 made as above from, e.g., an adhesive-coated metal foil that is attached to the top side of support tab 82 and the bottom side of pull tab 84. A part of the closure panel 50 is adhesively attached to and covers vessel 30 to keep the condiment fresh inside. Both support tab 82 and pull tab 84 extend through slot 25 formed in the side wall of food service container 12 when the condiment package is inserted inside the container. A customer simply grabs hold with his fingers of pull tab panel 84 and pulls it laterally in direction X to peel the closure panel off of the package and through slot 25 until it is removed from the container to open the package, as described above. In this manner, the pull tab panel 84 to which the foil closure panel 50 is affixed is easier to pull than the foil itself. This reduces the risk of the foil closure panel 50 tearing while it is being opened by the customer.

While the self-combining food service receptacle 10 of the present invention has been described with respect to, for example, French fries dipped into ketchup, or carrot sticks dipped into ranch sauce, it can be readily used for other food items not constituting finger foods. For instance, yogurt could be contained inside the upper portion of food container 12 with a topping like granola or strawberries or blueberries contained inside the sealed package 16 in the bottom portion of food service container 12. When the foil closure panel 50 is peeled away from the package 16, as described above, the yogurt will fall into contact with the granola pieces or fruit. The customer can then stir the combined mixture with a spoon and eat it from the container. In a similar manner, soft-serve ice cream contained in the upper portion of the food service container can be readily combined with toppings like M&M's or cookie pieces stored in the sealed package 16 when the package is unsealed with the resulting ice cream and toppings combination stirred and eaten from the container.

The self-combining food service receptacle 10 of the present invention provides a number of beneficial advantages. First, a person can combine the food ingredients stored in the food container 12 and sealed package 16 when the package is opened without mess with the resulting combined food item eaten directly from the receptacle. Second, this combination step can be performed when the person is ready to eat the food instead of beforehand. Third, the combination step can be performed easily with two hands without the need for a third hand required to hold the food service container, condiment, or food item to be dipped. Fourth, a restaurateur can allow its customer to specify a particular condiment of choice, and therefore expand the variety of condiments made available to its customers.

Figure 9:
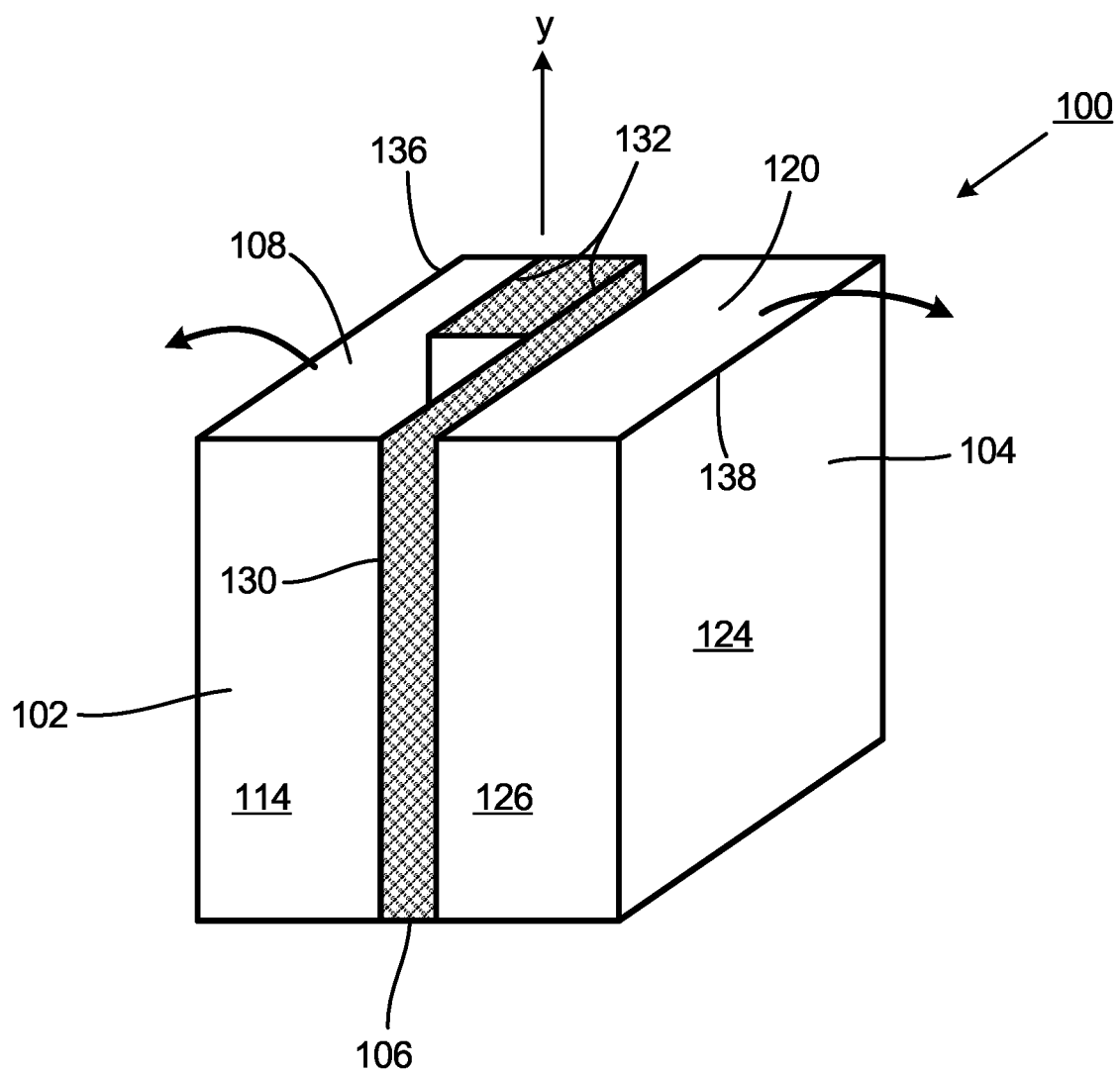
FIG. 9 is perspective view of an alternative embodiment of a self-combining receptacle of the present invention for producing an admixture product.
Figure 10:
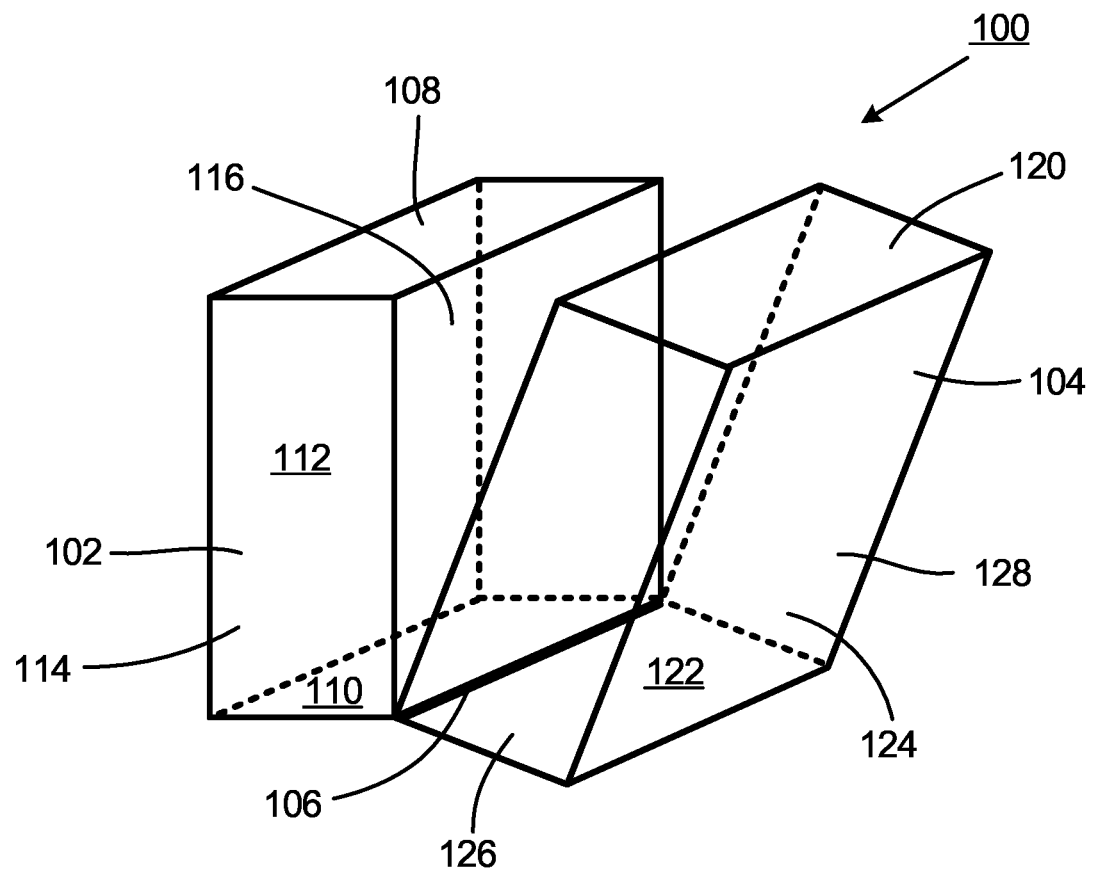
FIG. 10 is perspective view of the self-combining receptacle of FIG. 9 with the two open-faced receptacles opened with respect to each other.

Yet another embodiment of the self-combining receptacle 100 is shown in FIGS. 9-10. It is useful for producing an admixture product. It comprises first open-faced receptacle 102 and second open-faced receptacle 104 that are connected together along their adjacent bottom edges via hinge 106. First open-faced receptacle has top panel 108, bottom panel 110, outer panel 112, and side panels 114 and 116. Second open-faced receptacle 104 has top panel 120, bottom panel 122, outer panel 124, and side panels 126 and 128.

First open-faced receptacle 102 and second open-faced receptacle 104 can be biased towards each other along hinge 106 positioned along the adjacent edges of bottom panel 110 of first open-faced receptacle 102 and bottom panel 122 of second open-faced receptacle 104. The respective open-faces of the two receptacles meet along plane D, so that the interior volumes of the two receptacles form a larger combined chamber E. Meanwhile closure panel 130 is positioned across these open faces with its one surface secured by means of a releasable pressure-sensitive adhesive to first receptacle 102 and its opposite surface secured by means of a releasable pressure-sensitive adhesive to second receptacle 104. Removal tab 132 extends from the top edge of closure panel 130.

A first component F of an admixture is contained inside first receptacle 102. Meanwhile, a second component G of the admixture is contained inside second receptacle 104. The closure panel 130 prevents the components F and G from mixing with each other. But when a user pulls upwards on removal tab 132 in direction Y to peel closure panel 130 away from the open faces of the first receptacle 102 and second receptacle 104, then components F and G may freely mix with each other to form the resulting admixture.

The admixture product may constitute a food dish like strawberries, blueberries, or granola pieces mixed into yogurt, or nuts, chocolate pieces, candies or syrup mixed into ice cream. Alternatively, the admixture may comprise an industrial product like two resin components mixed with each other to form an epoxy adhesive. Top panel 108 on first receptacle 102 and top panel 120 on second receptacle 104 may be opened along hinged edges 136 and 138, respectively, to provide access to the content of the admixture produced inside the combined receptacles of self-combining receptacle 100, including to remove the admixture product after it is mixed.

Figure 11:
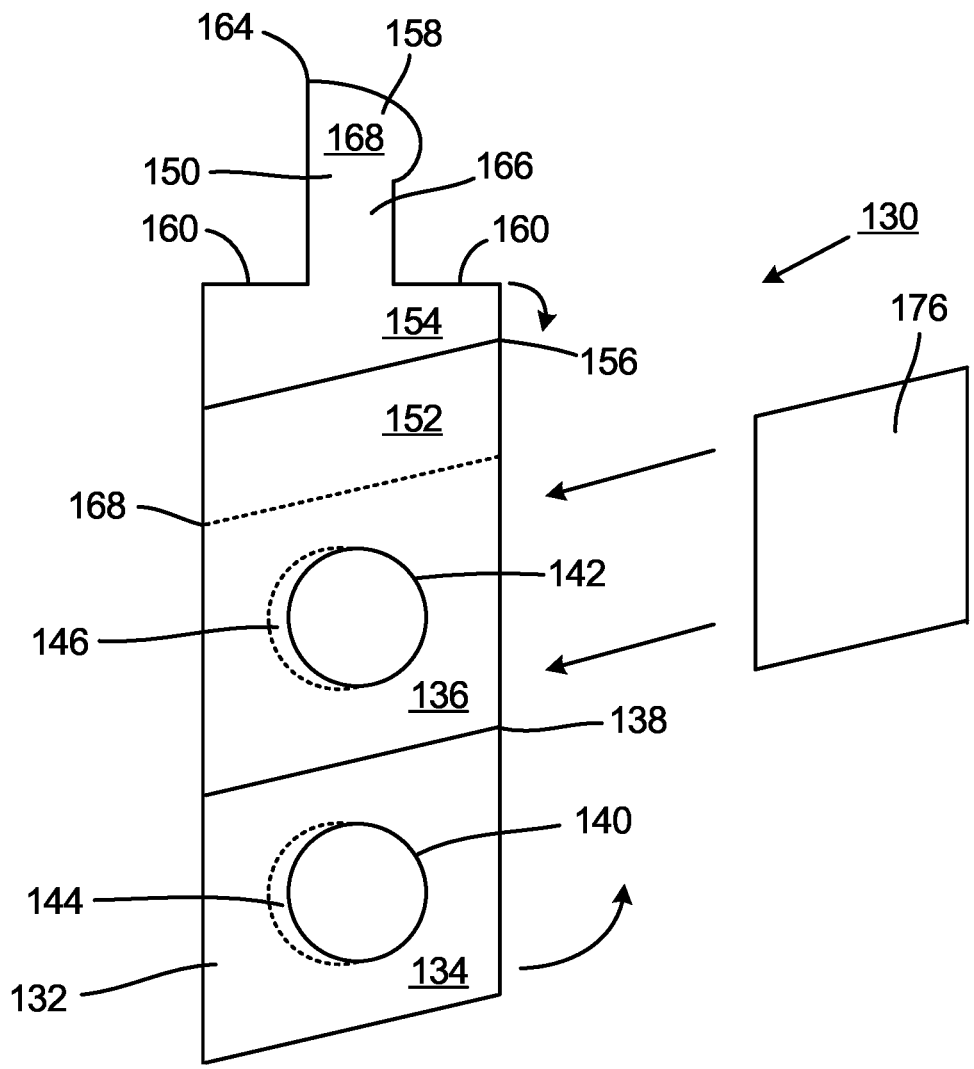
FIG. 11 is a perspective frontal view of another alternative embodiment of a self-combining receptacle for producing an admixture product with the subpanels with the vessels extending from their rear faces in an unfolded state.
Figure 12:
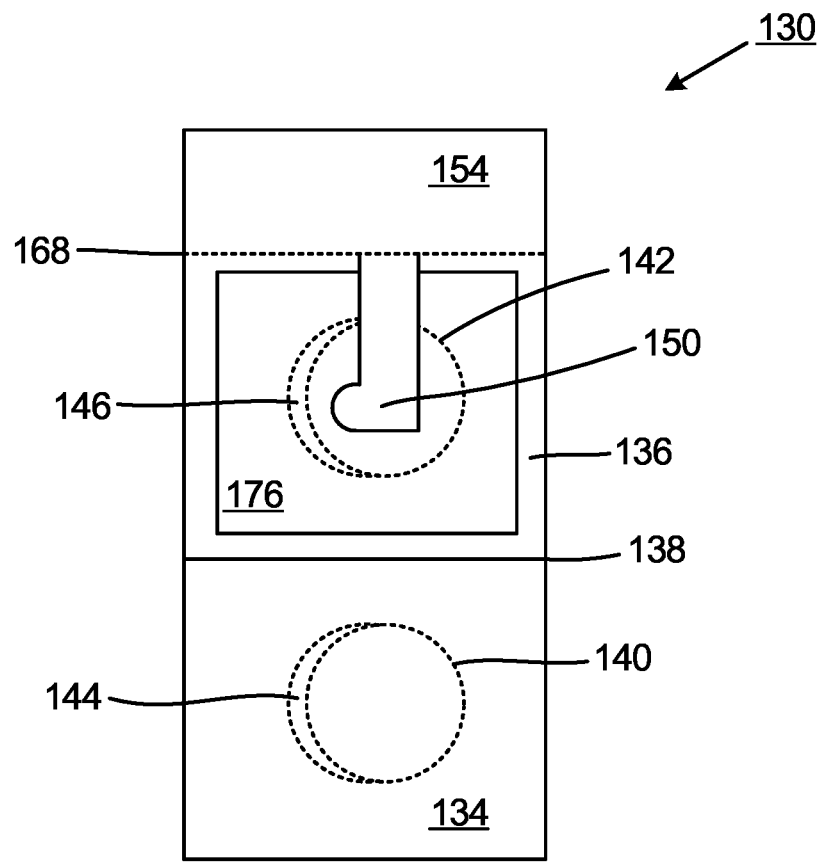
FIG. 12 is a perspective frontal view of the self-combing receptacle of FIG. 11 with the utensil device folded over on top of the closure panel and second subpanel.
Figure 13:
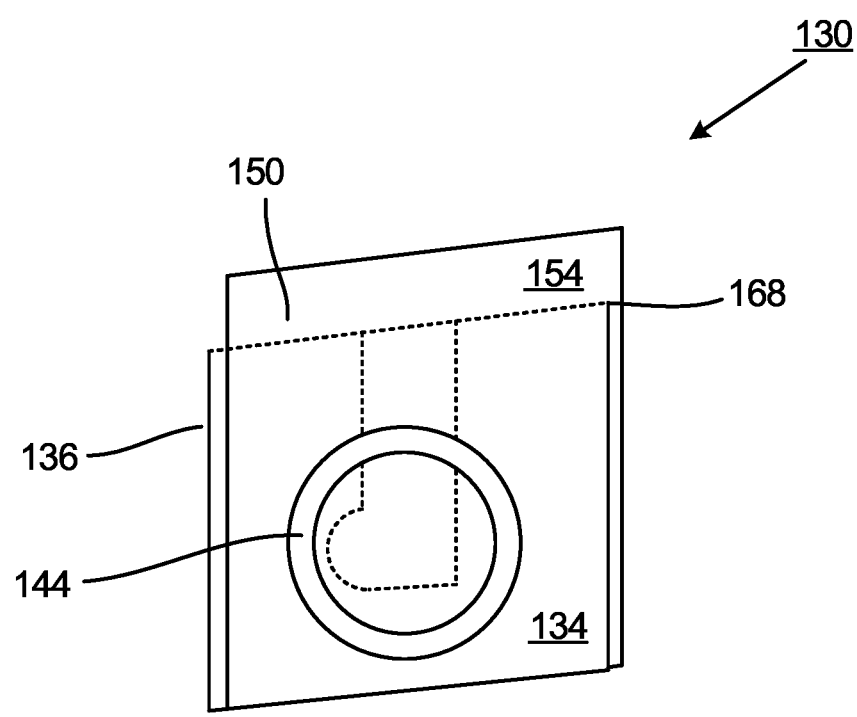
FIG. 13 is a perspective frontal view of the self-combining receptacle of FIG. 12 with the first subpanel folded over the second subpanel, and the closure panel and utensil device positioned in between the two subpanels.

Yet another embodiment of the self-combining receptacle 130 for producing an admixture product of the invention is shown in FIGS. 11-13. It comprises a panel 132 made from a suitable material like cardboard, coated cardboard, or a polymer plastic like polyethylene, polypropylene, polystyrene, polyethylene terephthalate ("PET"), acrylic, or polyester. Panel 132 is subdivided into subpanel 134 and subpanel 136 that are separated by means of fold line 138. Subpanels 134 and 136 may have holes 140 and 142, respectively, cut into them with cups 144 and 146 inserted into the holes. Alternatively, cups 144 and 146 may be integrally molded to extend from the back face of subpanels 134 and 136.

Utensil device 150 extends from the top of panel 132. It comprises subpanels 152 and 154 divided by means of fold line 156, and paddle 158 extended from the top edge 160 of subpanel 154. Paddle 158 may be formed with any shape that provides sufficient surface area 162 for stirring, and a point 164 along its edge for piercing or cutting. The paddle 158 is connected to subpanel 154 by means of throat 156. Finally, subpanel 152 is connected to subpanel 136 by means of serrated tear line 168.

First product component 170 is added to cup 144 extended from the back face of subpanel 134, while second product component 172 is added to cup 146 extended from the back face of subpanel 136. A closure panel 176 is attached across the front face of subpanel 138 and cup 146 extending below it.

Closure panel 176 is made from a thin flexible sheet of the metal foil or film material that is secured to the substrate panel 136 surrounding the periphery of cup 146 with a releasable adhesive so that the closure panel may be removed by the user to gain access to the product component contained inside the cup. Thus the adhesive is applied to the peripheral edges of the closure panel 50 and the flat top surface 40 of substrate panel to provide a secure and uniform seal. The closure panel 50 may be made of any shape that is suitable for enabling it to seal the top of the substrate panel, but preferably it should match the shape and dimensions of the peripheral region around the cup 146 in order to make it easier to apply the adhesive at the appropriate spots on the bottom surface of the closure panel 176 and flat top surface of the substrate panel to produce the seal.

The adhesive may comprise a removable pressure-sensitive adhesive made from, e.g., acrylate-based polymers. Such releasable adhesive will generally exhibit low adhesion to form a temporary bond between the closure panel 176 and the peripheral region of the substrate panel 136 around the cup 146, while enabling it to be subsequently broken by the user to remove the closure panel 176 from the substrate panel 136.

Utensil device 150 is folded over subpanel 152 and subpanel 136 with paddle 158 extended over closure panel 176 and cup 146 extended below it. Fold line 156 provides a convenient means for folding utensil device 150 over the subpanels to ensure that the paddle 158 is in proper orientation over cup 146.

As shown in FIG. 13, subpanel 138 with cup 144 is folded on top of subpanel 136 along fold line 136. Now cup 144 and cup 146 extend from the front and back faces, respectively, of the folded panel substrate 132 with their opening tops separated by means of closure panel 176. Utensil device 150 is contained between subpanel 134 and subpanel 136 with its paddle 158 positioned between closure panel 176 and subpanel 134. The side edges 180 and 182 and bottom edge 184 of the subpanels 134 and 136 may be thermo-welded together in order to make this subpanel assembly 186 sealed along these three edges.

The user may quickly and conveniently mix the first product component 170 and second product component 172 together by means of grasping the utensil device 150 and twisting the assembly of the folded-over subpanels 152 and 154 with respect to the assembly of the folded-over subpanels 134 and 136 along the serrated tear line 168. This twisting motion will enable pointed edge 164 on paddle head 158 to pierce and tear closure panel 176 sealing cup 146. Now the first product component 170 contained inside cup 144 is free to mix with second product component 172 contained inside cup 146. Paddle surface 162 of paddle utensil 158 promotes thorough mixing. Once the two product components are adequately mixed together to produce the admixture product, the user can tear utensil device assembly 150 off of the rest of the subpanel assembly along serrated tear line 168 to separate it and create an outlet opening since the top edges of subpanels 134 and 136 along this serrated tear line were not thermo-welded together. The user can press the bottom faces of cups 144 and 146 together with his hands to force the admixture product out of the outlet opening.

The above specification and drawings provide a complete description of the self-combining food service receptacle and use of such receptacle of the invention. Many alternative embodiments of the invention can be made without departing from the spirit and scope of the invention. Therefore, the invention resides in the claims hereinafter appended.

I claim:

1. A self-combining receptacle for producing a fully or partially-coated product or an admixture product formed from a first component and a second component, the self-combining receptacle comprising:
   (a) a service receptacle having a bottom panel and side wall panels connected to each other to form an interior volume with a first slot formed within one of the side wall panels;
   (b) a container package comprising a vessel for containing the second component and a closure panel having a top surface and a bottom surface sealed to a top of the vessel by means of a releasable adhesive, the closure panel having a leading edge extending therefrom;
   (c) a removal lever having a top surface, a bottom surface, and a surface area connected to the leading edge of the closure panel at a hinge point, the removal lever having a leading edge opposite to the edge that is connected to the leading edge of the closure panel, the removal lever being folded back upon the closure panel at the hinge point with the top surface of the removal lever in contact with the top surface of the closure panel;
   (d) a backer strip attached to the bottom surface of the removal lever and covering substantially all of the surface area of the removal lever, the backer strip made from a different material than the material that forms the removal lever or the closure panel;
   (e) the container package being inserted into a bottom of the interior volume of the service receptacle with the leading edge of the removal lever extending through the first slot formed within the side wall panel of the service receptacle in which the first slot is formed;
   (f) the first component being placed inside the interior volume of the service receptacle on top of the removal lever that is folded back upon the closure panel of the sealed container package;
   (g) wherein the leading edge of the removal lever extending through the first slot formed within the side wall panel of the service receptacle outside the service receptacle is pulled laterally in a direction away from the service receptacle to break the seal provided by the releasable adhesive and peel the closure panel and the leading edge of said closure panel to which the removal lever is attached away from the container package to open the container package, and the backer strip attached to the bottom surface of the removal lever strengthens the removal lever and closure panel to prevent tearing of the closure panel as said closure panel is peeled away from the container package; and
   (h) wherein the first component drops into the second component contained inside the opened container package to coat the first component with the second component to produce the fully or partially-coated product, or mix the first component and the second component together to produce the admixture product.

2. The self-combining receptacle of claim 1, wherein the removal lever comprises a second portion of the closure panel that is doubled back upon a first portion of the closure panel at a hinge point, the leading edge of the second portion of the closure panel being extended through the first slot formed within the side wall panel of the service receptacle in which the first slot is formed, so that as the leading edge of the second portion of the closure panel is pulled laterally in a direction away from the service receptacle to break the releasable adhesive, the first portion of the closure panel is peeled away from the container package to open the package container.

3. The self-combining receptacle of claim 1, wherein the closure panel is formed from a metal foil or a plastic film material.

4. The self-combining receptacle of claim 1, wherein the releasable adhesive comprises a pressure-sensitive adhesive material.

5. The self-combining receptacle of claim 1, wherein the vessel of the package container is formed from a polymer plastic material consisting of the group of polyethylene, polypropylene, polystyrene, polyethylene terephthalate, acrylic, and polyester.

6. The self-combining receptacle of claim 1, wherein a portion of the side wall panel of the service receptacle adjacent to the first slot acts like a squeegee to remove the second component from a bottom face of the closure panel as the closure panel is pulled through the first slot to keep the second component inside the interior volume of the service receptacle.

7. The self-combining receptacle of claim 1 further comprising a second slot formed within the side wall panel of the service receptacle containing the first slot, the second slot being located above the first slot, wherein the portion of the closure panel pulled through the first slot is inserted through the second slot to reduce any mess by residual second component on the bottom face of the closure panel.

8. The self-combining receptacle of claim 1, wherein the first component comprises a finger food to be fully or partially-coated.

9. The self-combining receptacle of claim 8, wherein the second component comprises a condiment.

10. The self-combining receptacle of claim 1, wherein the first component and second component comprise separate food items to be mixed together.

11. The self-combining receptacle of claim 1, wherein the first component and second component comprise separate chemicals of an industrial product to be mixed together.

12. The self-combining receptacle of claim 1, wherein the backer strip is formed from a cardboard or a plastic material.

13. A self-combining receptacle for producing a fully or partially-coated product or an admixture product formed from a first component and a second component, the self-combining receptacle comprising:

(a) a service receptacle having a bottom panel and side wall panels connected to each other to form an interior volume with a first slot formed within one of the side wall panels;

(b) a container package comprising a vessel for containing the second component and a closure panel having a top surface and a bottom surface sealed to a top of the vessel by means of a releasable adhesive, the closure panel having a leading edge extending therefrom;

(c) a removal lever having a top surface, and a bottom surface connected to the leading edge of the closure panel at a hinge point, the removal lever having a leading edge opposite to the edge that is connected to the leading edge of the closure panel, the removal lever being folded back upon the closure panel at the hinge point with the top surface of the removal lever in contact with the top surface of the closure panel;

(d) a backer strip attached to the bottom surface of the removal lever, the backer strip made from a cardboard material that is different than the material that forms the removal lever or the closure panel;

(e) the container package being inserted into a bottom of the interior volume of the service receptacle with the leading edge of the removal lever extending through the first slot formed within the side wall panel of the service receptacle in which the first slot is formed;

(f) the first component being placed inside the interior volume of the service receptacle on top of the removal lever that is folded back upon the closure panel of the sealed container package;

(g) wherein the leading edge of the removal lever extending through the first slot formed within the side wall panel of the service receptacle outside the service receptacle is pulled laterally in a direction away from the service receptacle to break the seal provided by the releasable adhesive and peel the closure panel and the leading edge of said closure panel to which the removal lever is attached away from the container package to open the container package, and the backer strip attached to the bottom surface of the removal lever strengthens the removal lever and closure panel to prevent tearing of the closure panel as said closure panel is peeled away from the container package; and (h) wherein the first component drops into the second component contained inside the opened container package to coat the first component with the second component to produce the fully or partially-coated product, or mix the first component and the second component together to produce the admixture product.

* * * * *